US008984324B2

(12) United States Patent
Shintani

(10) Patent No.: US 8,984,324 B2
(45) Date of Patent: Mar. 17, 2015

(54) ESTABLISHING CLOCK SPEED FOR LENGTHY OR NON-COMPLIANT HDMI CABLES

(75) Inventor: Peter Shintani, San Diego, CA (US)

(73) Assignee: Sony Corporation, Tokyo (JP)

( * ) Notice: Subject to any disclaimer, the term of this patent is extended or adjusted under 35 U.S.C. 154(b) by 848 days.

(21) Appl. No.: 13/024,498

(22) Filed: Feb. 10, 2011

(65) Prior Publication Data

US 2012/0206656 A1 Aug. 16, 2012

(51) Int. Cl.

| | |
|---|---|
| ***G06F 1/04*** | (2006.01) |
| ***G06F 1/12*** | (2006.01) |
| ***G06F 5/06*** | (2006.01) |
| ***G09G 5/12*** | (2006.01) |

(52) U.S. Cl.

CPC ............ *G09G 5/12* (2013.01); *G09G 2370/047* (2013.01); *G09G 2370/12* (2013.01)

USPC .......................................................... 713/600

(58) Field of Classification Search

USPC ................................................. 713/500, 600

See application file for complete search history.

(56) References Cited

U.S. PATENT DOCUMENTS

| | | | | |
|---|---|---|---|---|
| 3,783,254 | A * | 1/1974 | Eichelberger | 708/100 |
| 8,744,081 | B2 * | 6/2014 | Christison | 380/270 |
| 2004/0080671 | A1 * | 4/2004 | Siemens et al. | 348/473 |
| 2005/0027993 | A1 | 2/2005 | Yanagisawa | |
| 2005/0182876 | A1 | 8/2005 | Kim et al. | |
| 2007/0055876 | A1 * | 3/2007 | Choi | 713/170 |
| 2007/0103204 | A1 | 5/2007 | Egan et al. | |
| 2007/0228256 | A1 * | 10/2007 | Mentzer et al. | 250/208.1 |
| 2008/0246626 | A1 * | 10/2008 | Sheafor et al. | 340/825.21 |
| 2009/0052208 | A1 | 2/2009 | Li | |
| 2009/0074051 | A1 | 3/2009 | Manapragada et al. | |
| 2009/0246626 | A1 | 10/2009 | Tasaki et al. | |
| 2009/0278984 | A1 | 11/2009 | Suzuki et al. | |
| 2010/0026867 | A1 * | 2/2010 | Matsufuji et al. | 348/308 |
| 2010/0265933 | A1 * | 10/2010 | Hijazi et al. | 370/345 |
| 2012/0093212 | A1 * | 4/2012 | Oh et al. | 375/224 |

FOREIGN PATENT DOCUMENTS

KR 1020090052823 A * 12/2010 ................ G06F 3/14

* cited by examiner

*Primary Examiner* — Mohammed Rehman

(74) *Attorney, Agent, or Firm* — John L. Rogitz

(57) ABSTRACT

A method whereby the frequency of the clock of an internal bus of a sink of High Definition Multimedia Interface (HDMI) data is reduced, and possibly deep color mode of a sink deactivated, in response to an inability of a source of HDMI data to read extended display identification data (EDID) and/or effect High Definition Content Protection (HDCP) authentication with the sink.

18 Claims, 2 Drawing Sheets

ESTABLISHING CLOCK SPEED FOR LENGTHY OR NON-COMPLIANT HDMI CABLES

I. FIELD OF THE INVENTION

The present application relates generally to establishing clock speed for lengthy or non-compliant HDMI cables.

II. BACKGROUND OF THE INVENTION

Modern high definition TVs present video using High Definition Multimedia interface (HDMI). HDMI entails use of various additional protocols including High Definition Content Protection (HDCP), which ensures that only authorized displays such as authorized TVs can play HDMI from authorized sources such as authorized set top boxes (STB) and authorized disk players. The main video data is carried in one-way HDMI form and consists of three data channels plus one clock channel, typically conveyed using a signaling protocol known as Transition Minimized Differential Signaling (TMDS).

In HDMI, the device such as a disk player that sends multimedia to a display such as a TV is called the “source”, while the displaying device (e.g., the TV) is referred to as the “sink”. Accordingly, these terms may be used herein although without intending to be delimiting on the scope of the invention.

In addition, also typically housed within a single HDMI cable is a two-way Display Data Channel (DDC) line, for exchanging signaling such as periodic HDCP authentication and display capabilities known as extended display identification data (EDID). A consumer electronic control (CEC) line may also be provided in a HDMI cable assembly to carry consumer-generated commands. The various lines in the HDMI cable assembly may terminate in respective buses at the display (sink), e.g., the HDMI data terminate in a main HDMI bus and the DDC line terminates in an inter integrated circuit (“I2C” or “IIC”) bus.

As understood herein, if a poor quality or non-compliant transmission component is used, such as a HDMI cable assembly that is excessively long or of poor quality construction, DDC and/or TMDS data may arrive at the sink with marginal signal integrity, adversely affecting video/audio presentation.

SUMMARY OF THE INVENTION

As further understood herein, it would be advantageous for a HDMI presentation system to adapt as required to address the above-noted deficiencies. Present principles understand that while equalizers for TMDS data are available, such is not the case for DDC, and moreover advantages would accrue to applying adaptive principles to TMDS as well despite the availability of equalizers.

Accordingly, a source of high definition multimedia interface (HDMI) data attempts to read extended display identification data (EDID) from a sink of HDMI data. The source of HDMI data may alternatively or additionally be used to effect High Definition Content Protection (HDCP) authentication with the sink. Responsive to a determination that the HDMI data source cannot read the EDID and/or effect HDCP authentication, the source reduces a frequency of a clock of an internal bus of the sink, typically in a context in which the sink is a slave in a master-slave relationship with the source and hence the source controls the clock speed in the sink through appropriate signaling between the source and sink.

In some embodiments the internal bus of the sink is an inter integrated circuit (I2C) bus. If it is determined that the source can read the EDID and/or effect HDCP authentication, but TMDS signal quality is not satisfactory, the source can reduce a frequency of a pixel clock. A Display Data Channel (DDC) link can be used by the source to attempt to read the EDID from the sink and/or effect HDCP authentication with the sink and to signal the sink to reduce the frequency of a pixel clock. A consumer electronics control (CEC) communication link may also be used to signal for reduced the frequency.

As understood herein, if the source can detect that there is a communication issue, it can unilaterally drop the IIC bus clock as it is the source of the IIC bus clock. This detection can be accomplished by sensing any IIC bus errors, such as a lack of a response or lack of an ACK from the sink. On the other hand, of the source cannot easily detect the existence of low TMDS signal quality, meaning the source, to detect a defect in TMDS signal quality, must get some feedback from the sink. One indication as understood herein of poor TMDS signal quality is that there may be an occasional HDCP error if the sink misses a frame increment flag, and HDCP goes out of synchronization. However, if the sink does some self-analysis of the TMDS signal and determines that the signal quality is marginal, it could then send a message up to the source, either via the IIC/DDC or CEC bus requesting a format change that would allow the usage of a lower pixel, clock frequency for the TMDS.

In non-limiting implementations, the source attempts to read the EDID from the sink and/or attempts to effect HDCP authentication with the sink over a Display Data Channel (DDC) link. After reducing the frequency responsive to a determination that the source cannot read the EDID and/or effect HDCP authentication, the source can re-attempt to read the EDID of the sink and/or effect HDCP authentication. Responsive to a determination that the re-attempting failed, the source can determine whether a minimum frequency at the sink has been reached and responsive to a determination that the minimum frequency at the sink has been reached, the source may cause the sink to disable a deep color mode and render data in a normal mode. The deep color mode uses more data to render a pixel than the normal mode. Note that changing from the deep color mode to the normal mode reduces the pixel clock and typically is not related to the DDC/IIC clock.

In another aspect, a sink of high definition multimedia interface (HDMI) data contains a sink processor and a computer readable storage medium accessible to the processor to cause the processor to execute logic. The logic includes receiving a signal from a source of HDMI data representing a determination that quality of HDMI transmission fails to meet a threshold quality. The sink responds to the signal by operating according to a slower clock of a bus of the sink.

In yet another aspect, a source of high definition multimedia interface (HDMI) data has a processor and a computer readable storage medium accessible to the processor to cause the processor to execute logic. The logic executed by the source includes determining whether HDMI communication quality with a sink meets a threshold. If the source processor determines that the quality does not meet the threshold, it will reduce a frequency of a clock of an internal bus of the sink.

The details of the present invention, both as to its structure and operation, can best be understood in reference to the accompanying drawings, in which like reference numerals refer to like parts, and in which:

DETAILED DESCRIPTION OF THE PREFERRED EMBODIMENT

Figure 1:
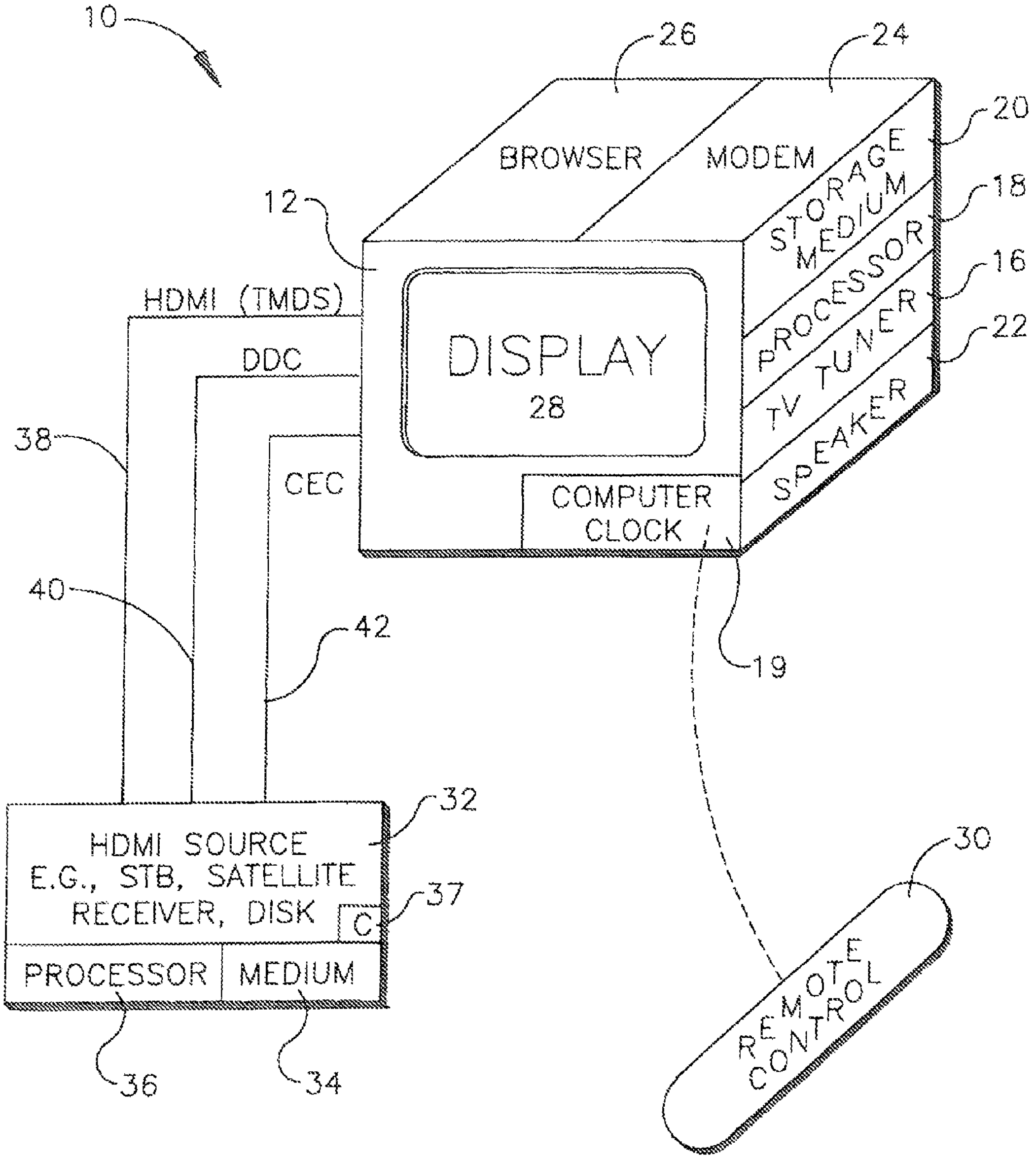
FIG. 1 is a block diagram of a non-limiting example system in accordance with present principles.

Referring initially to the non-limiting example embodiment show in FIG. 1, a system 10 includes a sink 12 of audio video data. The sink 12 may be implemented by a TV including a TV tuner 16 communicating with a TV processor 18 accessing a tangible computer readable storage medium 20 such as disk-based or solid state storage. The sink may be implemented by other display devices as well. The processor 18 may communicate with one or more computer clocks 19 including a non-HDMI I2C bus clock and a HDMI display data dock (DDC). The frequency of one or more of these clocks in the sink may be controlled by the below-described source of multimedia data.

The TV 12 can output audio on one or more speakers 22. The TV 12 can receive streaming video from the Internet using a built-in wired or wireless modem 24 communicating with the processor 12 which may execute a software-implemented browser 26. Video is presented under control of the TV processor 18 on a TV display 28 such as but not limited to a high definition TV (HDTV) flat panel display. User commands to the processor 18 may be wirelessly received from a remote control (RC) 30 using, e.g., rf or infrared.

As shown, the sink 12 may receive HDMI signals from a source 32 of HDMI such as, e.g., a set-top box, a satellite receiver, a disk player, etc. The source 32 typically includes a computer readable storage medium 34 such as disk-based and/or solid state storage that is accessed by a source processor 36. The source processor 36 communicates with one or more computer clocks 37.

HDMI data (three data, one clock) information is sent from the source 32 to the sink 12 through a HDMI wired or wireless path 38, whereas DDC information may be exchanged between the source 32 and sink 12 on a DDC wired path 40. CEC information may be exchanged between the source 32 and sink 12 on a CEC wired path 42. The wired paths 38-42 typically are included in a single HDMI cable assembly.

Figure 2:
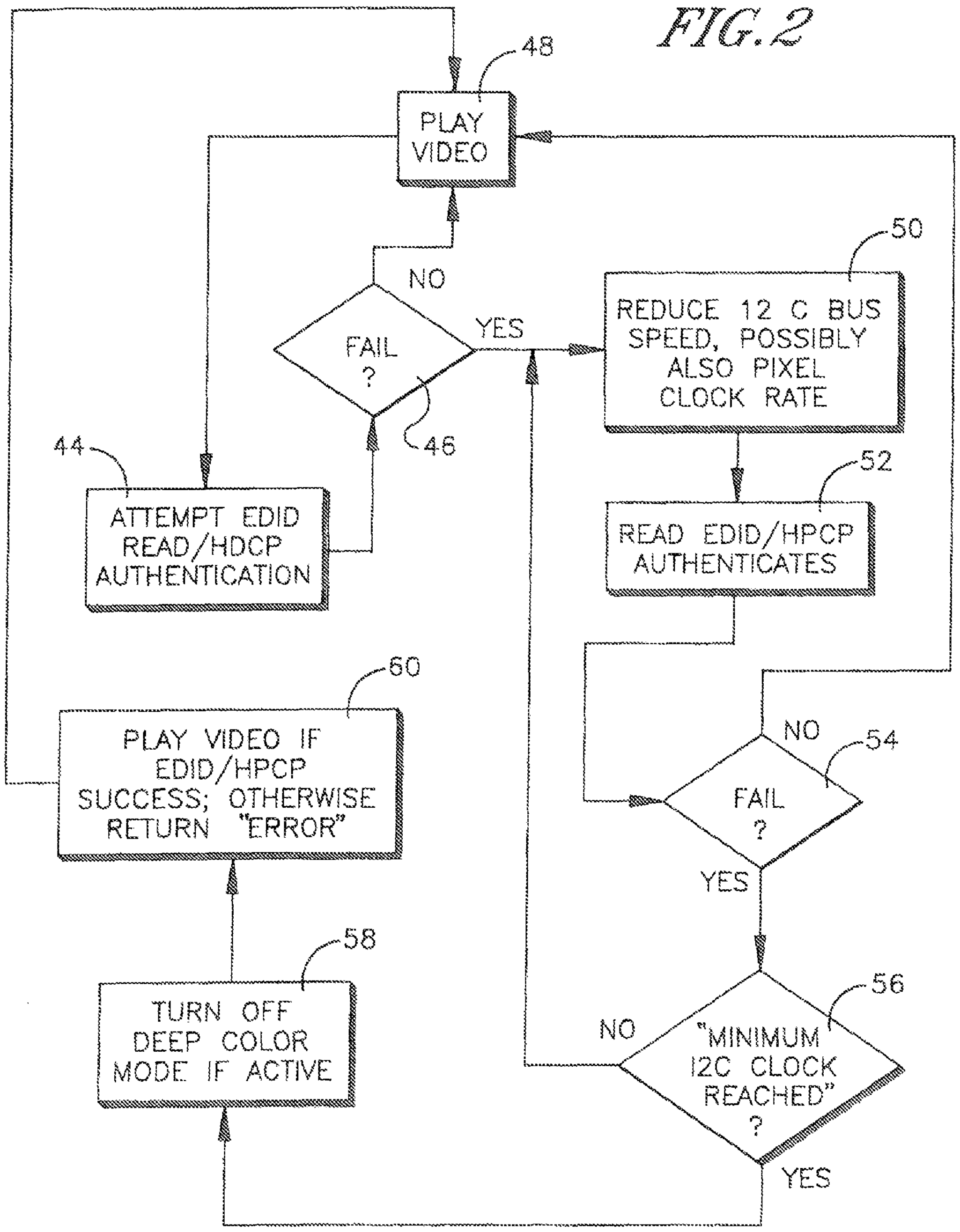
FIG. 2 is a flow chart of example logic.

Now referring to FIG. 2, example logic may be seen for adapting the sink 12 to unfavorable HDMI carrier conditions. Commencing at block 44, the source 32 attempts to read extended display identification data (EDID) from the sink 12 and/or attempts to effect High Definition Content Protection (HDCP) authentication with the sink 12. At decision diamond 46, it is determined whether the source 32 failed to read EDID and/or effect HDCP authentication, e.g., by failing to receive back an expected acknowledgement from the sink. If there was no failure, the logic moves to block 48 wherein the video is played successfully and the cycle begins again.

The source 32 may fail to read EDID and/or effect HDCP authentication within a preset number of attempts, in which case the logic moves to block 50. At block 50 the source reduces a frequency of a clock, e.g., the clock of the I2C internal bus of the sink 12 at block 50. In some implementations the CEC bus may be used to communicate a reduction in clock frequency although this is not needed in all embodiments. The commonplace speed for a clock of an I2C internal bus is 100 kHz. The source may also reduce pixel clock rate at block 50 if desired. The source can reduce the pixel clock rate unilaterally but present principles enable it to do with intelligence, e.g., because of indication that the sink is receiving poor quality signals. An authentication verification error, e.g., an I2C bus error, could occur, also resulting in a reduction of the I2C bus speed.

Moving to block 52, the source 32 can once again attempt to read EDID and/or authenticate HDCP after the reduction in clock frequency. It is determined whether the source 32 failed this secondary attempt at decision diamond 54. If there was no failure, the logic moves to block 48 wherein the video is played successfully and the cycle begins again. However, if the source 32 failed, the logic moves to decision diamond 56, at which point it is determined whether a minimum frequency of the I2C bus at the sink 12 has been reached.

The minimum frequency may not have been reached, and therefore the logic returns to block 50 and the source 32 further reduces I2C bus speed and if desired the pixel clock rate once more. If, at decision diamond 56, the minimum frequency has been reached and the HDMI communication quality does not meet a threshold, the logic moves on to block 58, causing the sink 12, on command of the source if desired, to disable the deep color mode if it is active and render data in a normal mode. The deep color mode uses more data (e.g., 10, 12 or 16 bit per pixel) to render a pixel than the normal mode (e.g., 8 bit per pixel). Once the deep color mode is disabled, the source 32 attempts to read EDID and/or effect HDCP authentication and, if successful, play the video at block 60. Note that the deep color mode typically only affects the TMDS clock and not the DDC clock. Normally, the TMDS clock equals the pixel clock, but when the deep color mode is being used, the TMDS clock is higher than the pixel clock. For instance, a 16 bit deep color display mode may have a TMDS clock that is twice the speed of the pixel clock. But, if the source 32 cannot read EDID and/or effect HDCP authentication, it will return an "error" message to the user at block 60. The process loops back from block 60 to block 48.

Note that if the source cannot detect an expected acknowledgement from the sink as discussed above, the source can use this non-detection of an expected acknowledgment as indicating an error. On the other hand, when failure to successfully complete HDCP authentication is used as the mechanism for detecting error, the source in some cases may simply try authentication again, instead of reducing the clock rate. Under these circumstances the sink can independently signal the source that the sink not receiving a correct I2C bus signal. Or, if the sink can detect that its HDMI signal is not 100% perfect, for instance by detecting some jitter in the signal from the source or detecting that the signal level of the TMDS is low, the sink can signal the source to reduce the TMDS clock and the IIC bus clock.

While the particular ESTABLISHING CLOCK SPEED FOR LENGTHY OR NON-COMPLIANT HDMI CABLES is herein shown and described in detail, it is to be understood that the subject matter which is encompassed by the present invention is limited only by the claims.

What is claimed is:

1. Method comprising:

attempting using a source of high definition multimedia interface (HDMI) data to read extended display identification data (EDID) from a sink of HDMI data, and/or attempting using the source to effect High Definition Content Protection (HDCP) authentication with the sink;

responsive to a determination that the source cannot read the EDID and/or effect HDCP authentication, reducing a frequency of a clock of an internal bus of the sink; and responsive to a determination that the source cannot read the EDID and/or effect HDCP authentication, causing the sink to disable a deep color mode and render data in a normal mode, the deep color mode using more data to render a pixel than the normal mode.

2. The method of claim 1, wherein the internal bus is an inter integrated circuit (I2C) bus.

3. The method of claim 1, further comprising, responsive to a determination that the source cannot read the EDID and/or effect HDCP authentication, reducing a frequency of a pixel clock of the sink.

4. The method of claim 1, wherein the source signals the sink and/or the sink signals the source, responsive to a determination that the source cannot read the EDID and/or effect HDCP authentication, to reduce the frequency.

5. The method of claim 4, wherein the source signals the sink and/or the sink signals the source to reduce the frequency using a consumer electronics control (CEC) communication link and/or a Display Data Channel (DDC) link.

6. The method of claim 1, wherein the source attempts to read the EDID from the sink and/or attempts to effect HDCP authentication with the sink over a Display Data Channel (DDC) link.

7. The method of claim 1, comprising responsive to a determination that the source cannot read the EDID, reducing a frequency of a clock of an internal bus of the sink.

8. Method comprising:

attempting using a source of high definition multimedia interface (HDMI) data to read extended display identification data (EDID) from a sink of HDMI data, and/or attempting using the source to effect High Definition Content Protection (HDCP) authentication with the sink;

responsive to a determination that the source cannot read the EDID and/or effect HDCP authentication, reducing a frequency of a clock of an internal bus of the sink;

after reducing the frequency responsive to a determination that the source cannot read the EDID and/or effect HDCP authentication, re-attempting to read the EDID of the sink and/or effect HDCP authentication, and responsive to a determination that the re-attempting failed, determining whether a minimum frequency at the sink has been reached and responsive to a determination that the minimum frequency at the sink has been reached, causing the sink to disable a deep color mode and render data in a normal mode, the deep color mode using more data to render a pixel than the normal mode.

9. A sink of high definition multimedia interface (HDMI) data, comprising:

a sink processor; and a computer readable storage media accessible to the processor to cause the processor to execute logic comprising:

receiving a signal from a source of HDMI data representing a determination that quality of HDMI transmission fails to meet a threshold quality;

responsive to the signal, slowing a clock of a bus of the sink, wherein the signal is a first signal and the logic further comprises, responsive to a second signal from the source, disabling a deep color mode and rendering data in a normal mode, the deep color node using more data to render a pixel than the normal mode.

10. The sink of claim 9, wherein the logic executed by the processor further includes:

sending extended display identification data (EDID) to the source and/or responding to attempts by the source to effect High Definition Content Protection (HDCP) authentication.

11. The sink of claim 9, wherein the bus is an inter integrated, circuit (I2C) bus.

12. The sink of claim 9, wherein the logic further comprises, responsive to the signal, reducing a frequency of a pixel clock of the sink.

13. The sink of claim 9, wherein the signal is received over a consumer electronics control (CEC) communication link and/or a Display Data Channel (DDC) link.

14. A source of high definition multimedia interface (HDMI) data, comprising:

a processor; and a computer readable storage medium accessible to the processor to cause the processor to execute logic comprising:

determining whether HDMI communication quality with a sink meets a threshold;

responsive to a determination that the quality does not meet the threshold, causing the sink to reduce a frequency of a clock of an internal bus of the sink; and responsive to a determination that HDMI communication quality does not meet the threshold, causing the sink to disable a deep color mode and render data in a normal mode, the deep color mode using more data to render a pixel than the normal mode.

15. The source of claim 14, wherein the determining logic includes attempting to read extended display identification data (EDID) from a sink of HDMI data, and/or attempting using the source to effect High Definition Content Protection (HDCP) authentication with the sink.

16. The source of claim 15, wherein the logic further comprises, responsive to a determination that the source cannot read the EDID and/or effect HDCP authentication, causing the sink to reduce a frequency of a pixel clock of the sink.

17. The source of claim 14, wherein the internal bus is an inter integrated circuit (I2C) bus.

18. A source of high definition multimedia interface (HDMI) data, comprising:

a processor; and a computer readable storage medium accessible to the processor to cause the processor to execute logic comprising;

determining whether HDMI communication quality with a sink meets a threshold;

responsive to a determination that the quality does not meet the threshold, causing the sink to reduce a frequency of a clock of an internal bus of the sink;

after causing the sink to reduce the frequency responsive to a determination that the source cannot read the EDID and/or effect HDCP authentication, re-attempting to read the EDID of the sink and/or effect HDCP authentication, and responsive to a determination that the re-attempting failed, determining whether a minimum frequency at the sink has been reached and responsive to a determination that the minimum frequency at the sink has been reached, causing the sink to disable a deep color mode and render data in a normal mode, the deep color mode using more data to render a pixel than the normal mode.

* * * * *